United States Patent Office 2,723,333
Patented Nov. 8, 1955

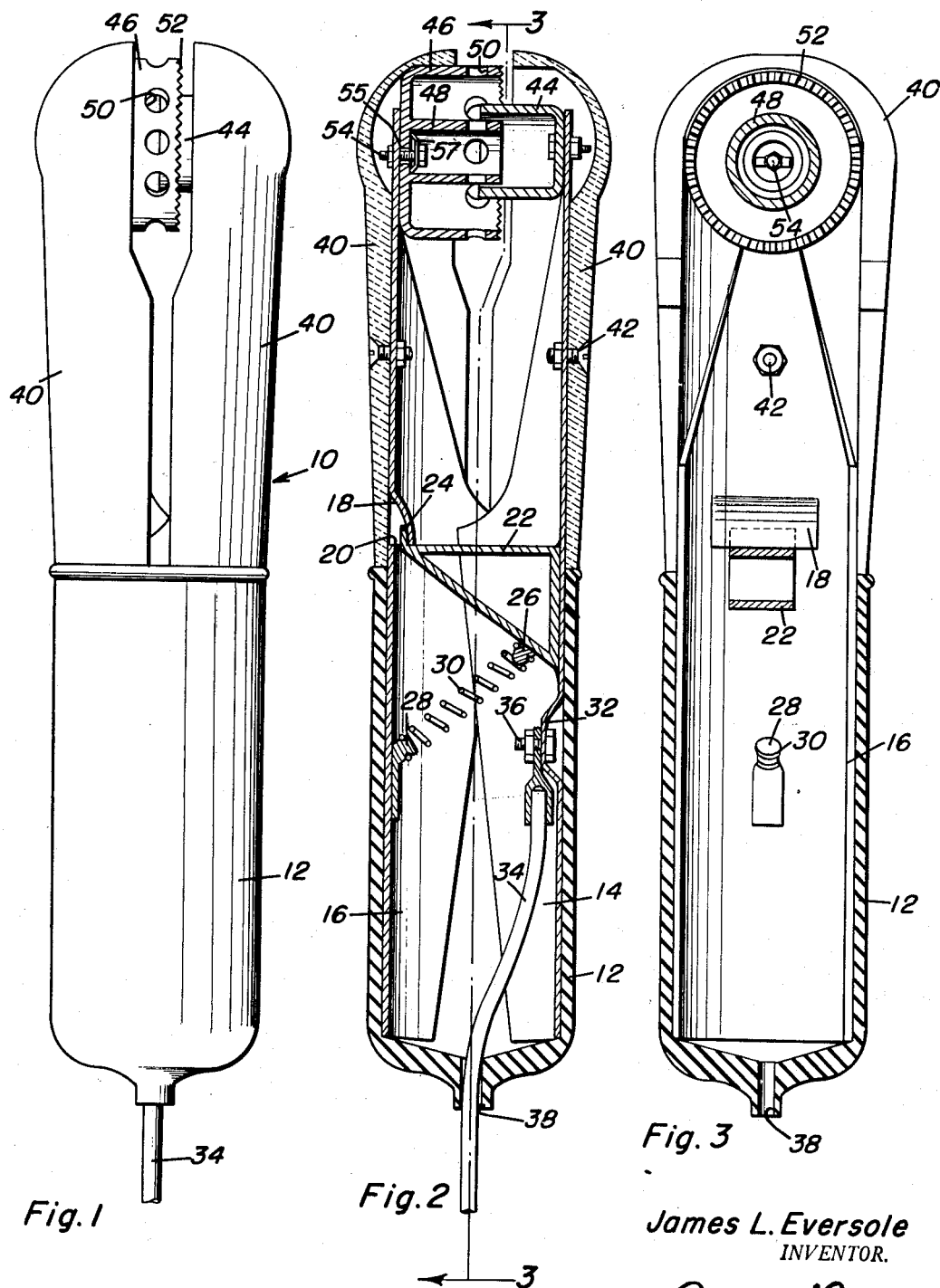

2,723,333

ELECTRODE HOLDER

James L. Eversole, Gibsonburg, Ohio

Application October 5, 1953, Serial No. 384,267

1 Claim. (Cl. 219—8)

This invention involves an electrode holder and more specifically provides an electrode holder for use in welding wherein the welding rods are maintained in adjustable position.

An object of this invention is to provide an electrode holder having a novel clamping means for retaining the electrode in the holder.

Another object of this invention is to provide an electrode holder which is quickly and easily adjustable and which is provided with an electrode holding clamp which is operable from the handle portion of the electrode holder.

A further object of this invention is to provide an electrode holder having an insulative portion having a pair of clamping members thereon.

A further object of this invention is to provide an electrode holder which is simple in construction, efficient in operation, well adapted for the purpose intended, accurate in adjustment and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the electrode holder of this invention;

Figure 2 is a longitudinal, top plan view of the construction of Figure 1 with a section taken substantially along the center line of the device; and Figure 3 is a longitudinal, vertical section taken subtantially along section line 3—3 of Figure 2 showing the details of construction of the electrode holder.

Referring now to the drawings, it will be seen that the electrode holder 10 includes a tubular resilient member 12 surrounding a pair of pivotal members 14 and 16. At the mid-portion of one of the pivotal members as indicated by the numeral 16 is an inwardly projecting member 18 forming an aperture 20. Secured to the opposite pivotal member 14 is a right triangular member 22 having a projecting lug 24 engaging the aperture 20 and the projection portion 18 thereby forming a pivot axis between the members 14 and 16. A projecting shoulder 26 is secured to one side of the right angular member 22 and a complementary projecting stud 28 is secured to the pivotal member 16 and a coil spring 30 is positioned between and secured to the projecting shoulder 26 and stud 28 thereby normally urging the pivotal members 16 and 14 outwardly toward the resilient tubular member 12. The inner surface of the pivotal member 14 is provided with an indented portion 32 for attaching an electrical conduit 34 thereto by a suitable fastening screw 36.

The electrical conduit 34 passes out of an aperture 38 in the base of the resilient tubular member 12 and is connected to a suitable welding machine (not shown). The other end of the pivotal members 16 and 14 have an insulated member 40 secured thereto by suitable fasteners 42 and the pivotal member 14 includes a tubular member 44 projecting inwardly therefrom and forming a clamp jaw. The other pivotal member 16 is provided with a pair of concentric inwardly projecting tubular members 46 and 48 with each of the tubular members provided with a plurality of radially spaced aligned apertures 50 for the reception of welding electrodes therein. The outer surface of the tubular member 46 is provided with serrations 52 for gripping more welding electrodes. It will be seen that the tubular member 44 fits over the tubular member 48 and between the tubular member 48 and the tubular member 46 thereby engaging the electrodes inserted into the apertures 50 and securely clamping and grounding the electrodes therein.

The operation of the device will be readily understood. The pivotal members 16 and 14 are squeezed together by applying pressure on the resilient tubular member 12 and and an electrode is inserted in the apertures 50 at the particular angle desired and the tubular members 46 and 48 may be rotated about the pivotal axis formed by the securing means 54. The bushing 55 surrounding the securing bolt 54 allows the tubular members 46 and 48 to rotate and a bowed spring 57 forms a friction holding means for the tubular members 46 and 48 wherein an electrode may be inserted in the apertures 50 and adjusted angularly by overcoming the frictional resistance caused by the spring 57. Obviously, the electrode completes the circuit from the electrical conductor 34 and the device is used in an obvious manner. The insulated material completely eliminates any possibility of burns and the adjustability of the device is almost universal.

From the foregoing the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

An electrode holder comprising a pair of elongated members pivotally attached to each other adjacent their mid-point, said members forming handle portions and electrode gripping portions, a resilient insulating covering on said handle portions, spring means disposed between said members urging said handle portions away from each other and said gripping portions towards each other, an electrical conductor secured to one of said members, and electrode gripping means on said gripping portions, said electrode gripping means including an open ended cylindrical member extending inwardly from the end of one of said members, a second cylindrical member extending inwardly in concentric relation to said first cylindrical member, and a third cylindrical member secured to the other of said pivotal members and telescopically received between said first and second cylindrical members, said first and second cylindrical members being rotatably mounted on said pivotal member, said first and second cylindrical members being provided with a plurality of aligned radial apertures therethrough for receiving the end of an electrode, said third cylindrical member being adapted to engage an electrode projecting through said apertures.

References Cited in the file of this patent

UNITED STATES PATENTS

| | | |
|---|---|---|
| 1,313,572 | Baker et al. | Aug. 19, 1919 |
| 2,296,482 | Reddick | Sept. 22, 1942 |
| 2,372,113 | Opgenorth | Mar. 20, 1945 |
| 2,465,157 | Isbell | Mar. 22, 1949 |